United States Patent [19]

Timmers

[11] Patent Number: 4,681,367

[45] Date of Patent: Jul. 21, 1987

[54] AUXILIARY SEAT

[76] Inventor: Richard E. Timmers, 1210 E. County Rd. B, Maplewood, Minn. 55109

[21] Appl. No.: 768,040

[22] Filed: Aug. 21, 1985

Related U.S. Application Data

[63] Continuation-in-part of Ser. No. 506,522, Jun. 21, 1983.

[51] Int. Cl.[4] .............................................. A47C 15/00
[52] U.S. Cl. .................................... 297/232; 297/238; 297/452; 297/193
[58] Field of Search ............... 297/232, 113, 238, 233, 297/192, 193, 452

[56] References Cited

U.S. PATENT DOCUMENTS

| | | | |
|---|---|---|---|
| 3,971,591 | 7/1976 | Ziaylek | 297/214 |
| 4,239,282 | 12/1980 | White | 297/284 |
| 4,365,840 | 12/1982 | Kehl et al. | 297/232 |
| 4,520,216 | 9/1985 | Hassel | 297/238 |
| 4,533,176 | 8/1985 | Wyttenbach | 297/238 |
| 4,596,420 | 6/1986 | Vaidya | 297/238 |

FOREIGN PATENT DOCUMENTS

| | | | |
|---|---|---|---|
| 2720954 | 12/1977 | Fed. Rep. of Germany | 297/232 |
| 2137084 | 10/1984 | United Kingdom | 297/232 |

Primary Examiner—Francis K. Zugel
Attorney, Agent, or Firm—Merchant, Gould, Smith, Edell, Welter & Schmidt

[57] ABSTRACT

An auxiliary seat (10) for use in motor vehicles is disclosed. The seat includes a seat base (12), a seat back (14), and a lid (16) hingedly connected to the seat base to form a console. The seat (10) further includes a pivoting armrest (22) and a seat belt (50). The auxiliary seat of this invention also includes a steel-like frame (40) to provide an exceptionally safe car seat.

1 Claim, 8 Drawing Figures

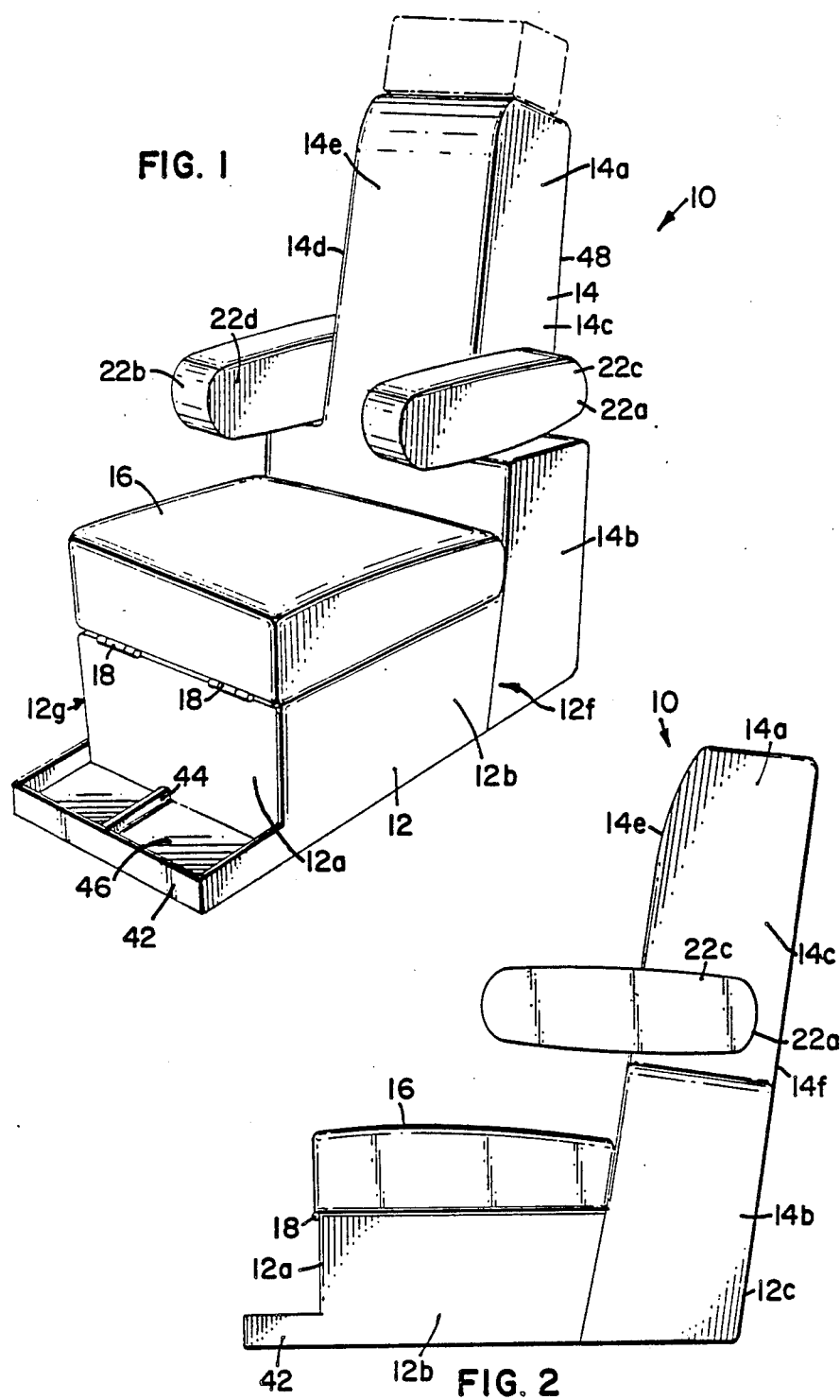

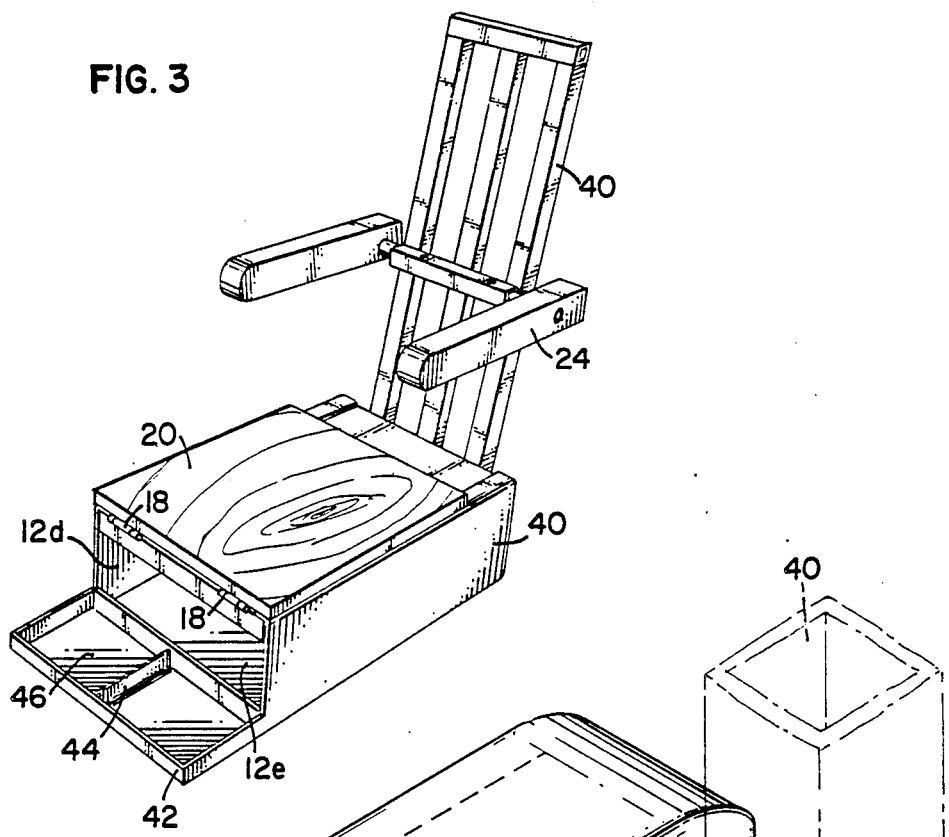
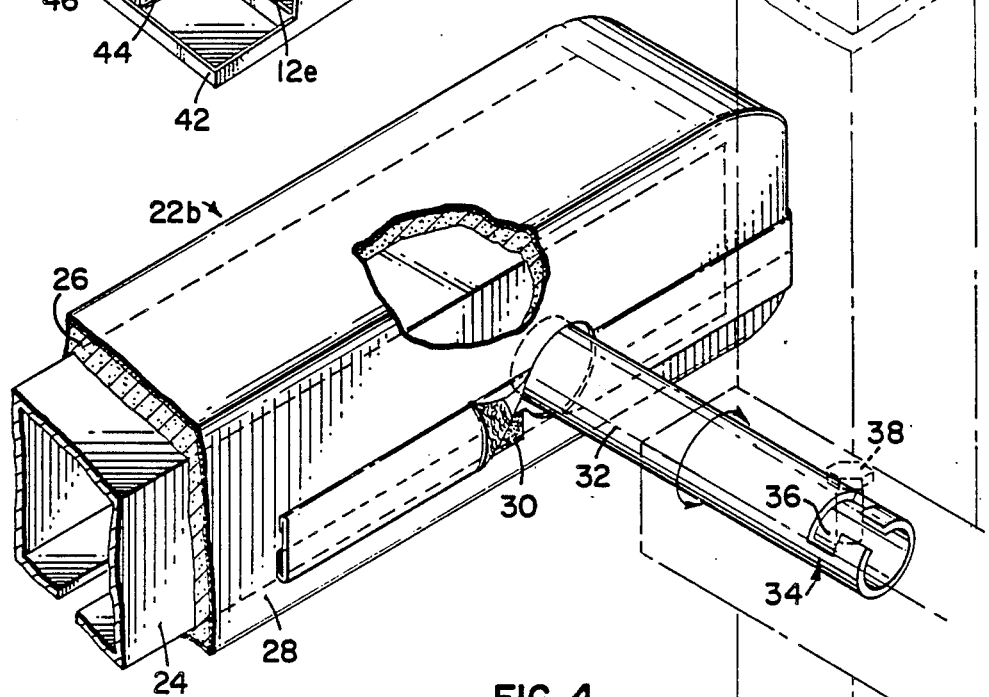

AUXILIARY SEAT

TECHNICAL FIELD

The present application is a continuation in part of application Ser. No. 506,522 filed on June 21, 1983. This invention relates generally to the field of auxiliary seating. More particularly, this invention relates to an auxiliary seat console for use in a motor vehicle.

BACKGROUND OF THE INVENTION

A variety of auxiliary seats have been used with motor vehicles. These seats include the child car seats required by statute in some states, as well as seats for use between the "bucket" seats which have been popular for many years.

The seats which have been available to date generally provide seating room but lack other desired features for safety and convenience. Typically they do not offer protection but instead may even contribute to injuries in an automobile accident. They may be dislodged from position, or may crumple or splinter in the event of an accident. Frequently such seats are inconvenient to use, do not blend well with the decor of the vehicle, and many are simply not sturdy enough for use by both children and adults.

In conventional pickup trucks, with bucket seats, there is typically no place for a child or third adult to ride comfortably. Even if three adults manage to ride within the cab, only two safety belts are generally available for them. This invention provides an auxiliary seat having a safety belt, whereby a third person can comfortably and safely ride in a pickup truck or other two-seated vehicle. While the seat may be removed or considered to be portable, it in fact is a very solid structure which is designed to be bolted to the floor of the vehicle in the same manner as are the factory-installed seats.

SUMMARY OF THE INVENTION

The present invention is an auxiliary seat, generally for use in motor vehicles although it can also be used in other environments such as the home as a safety seat for children. The auxiliary seat comprises a seat base, having a front end and a back end. The seat base is connected at the back end to a seat back having a top end, a bottom end, a left side, a right side, a front side and a back side. The seat base and the seat back define an approximately L-shaped form.

The seat base includes side walls, in the absence of a top wall, the side walls which define a receptacle. A lid is hingedly connected to the seat base for movement between raised and lowered positions with respect to the seat base. When in the lowered position, the lid forms a cover for the receptacle.

Underlying the seat base and seat back is a steel-like frame, defining the approximately L-shaped form of the connected seat base and seat back. The steel-like frame can be anchored to the floor of a motor vehicle.

The seat further includes an armrest having a back portion and an inner side. The armrest is connected at the inner side of the back portion to one of the left and right sides of the seat back. The armrest is pivotally connected to the seat back for movement between a raised and lowered position.

The seat further includes a seat belt. The seat belt has a first and a second portion, each portion having a first and a second end. The second end of each portion is securely fastened to the frame. The seat belt further includes means to releasably fasten the first ends of the two portions together.

The steel-like frame which can be anchored to the floor of the motor vehicle provides safety and protection to the occupant in the event of an accident or crash. The armrest provides comfort and can be utilized by either the seat occupant or the person sitting next to the auxiliary seat.

The side walls of the seat base and the hingedly connected lid form a storage box or console. Positioned between the two bucket seats, the console is highly convenient for the driver. Within the console can be stored maps, sunglasses, and the like.

The seat belt provides added safety and because it is fastened to the steel-like frame which is anchored to the vehicle floor, the seat belt can securely hold the passenger in the event of a serious accident. Rather than simply restraining a child from unwanted motion within the vehicle, the seat belt can actually provide safety in the event of an accident.

Other advantages of the invention will become apparent with reference to the accompanying Drawings, detailed description of the invention, and claims.

BRIEF DESCRIPTION OF THE DRAWINGS

FIG. 1 is a perspective view of one embodiment of the auxiliary seat incorporating the present invention.

FIG. 2 is a side elevational view of the auxiliary seat shown in FIG. 1.

FIG. 3 is a perspective view of the auxiliary seat shown in FIG. 1, as it appears before upholstering.

FIG. 4 is an enlarged perspective view of a portion of the auxiliary seat showing the attachment of the armrest to the frame and the adjacent area.

DETAILED DESCRIPTION OF THE INVENTION

Figure 5:
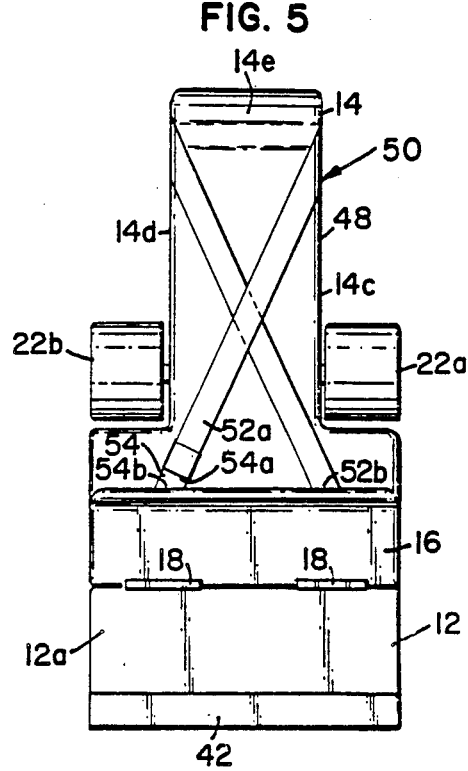
FIG. 5 is a front elevational view of the auxiliary seat shown in FIG. 1.

Referring to the Drawings, wherein like numerals represent like parts throughout the several views, there is generally designated at 10 an auxiliary car seat according to the present invention. The seat includes a seat base 12 and a seat back 14.

Seat base 12 comprises an area generally designated as front end 12g, an area generally designated as back end 12f, and side walls 12a, 12b, 12c, and 12d. The seat base can further comprise a bottom wall 12e. The bottom wall can be securely attached to the other four side walls or can comprise a removable insert of cardboard, plastic, or the like. A bottom wall is not necessary in the context of this invention where the auxiliary seat is to be positioned directly on the vehicle floor.

The side walls, and bottom wall if there is one, define or form a receptacle. Connected to the seat base is a lid 16. The lid is pivotally or hingedly connected for movement between raised and lowered positions with respect to the seat base. It forms a cover for the receptacle when in the lowered position, as illustrated in FIGS. 1 through 3.

The connection between lid 16 and seat base 12 can be by any means known in the art such as hinges 18, strips of flexible material securely attached to the lid and the seat base, or any other hinge means. As illustrated in the Drawings, hinges 18 are located along side wall 12a at the front of the seat base, so that the lid opens in a direction generally away from car seat 10. However, the hinge means could connect lid 16 to seat base 12 at any of the other side walls 12b, 12c, or 12d, to provide for opening of the receptacle in a more convenient direction, or to satisfy personal preference.

Lid 16 will generally comprise a lid base 20 as seen in FIG. 3. The lid base can be made of wood, for example ½" plywood, a metal sheet, fiberglass, or any suitable material. Lid base 20 is preferably upholstered. The upholstery preferably includes an inch or more of padding such as foamed rubber or the like covering the top and sides of the lid, with fabric such as an imitation leather or cloth upholstery fabric covering the padding or foam and, for aesthetics, also covering the bottom side of the lid.

Seat back 14 comprises areas generally designated as top end 14a, bottom end 14b, left side 14c, right side 14d, front side 14e, and back side 14f. Seat back 14 is attached or connected at bottom end 14b to the back end 12f of seat base 12. The seat base and seat back are connected such that they define an approximately L-shaped form. The angle between seat base 12 and seat back 14 can of course vary, but for comfort, will generally be greater than 90°.

Car seat 10 further includes one or more, preferably two, armrests, left armrest 22a and right armrest 22b. Armrests 22a and 22b each have a back portion 22c and an inner side 22d. The armrests comprise an underlying structure or frame 24 which can be made of wood, fiberglass, metal or the like. The frames of armrests 22a and 22b are preferably padded with a layer of foam or other padding 26, to provide comfort and safety. Surrounding the padding 26 is a covering material 28 which can be cloth, leather or imitation leather, or the like. An appropriately selected covering material will be aesthetically pleasing and will provide durability. The covering material 28 can be removable for cleaning. As illustrated in FIG. 4, the seam along the inner length of the armrest can be closed with VELCRO TM strips or patches 30 rather than permanently sealed, to provide removability of the covering material. The armrests 22a and 22b further include means for connecting them to the seat back 14.

Armrests 22a and 22b are connected at inner side 22d of back portion 22c, to one of the sides 14c and 14d of seat back 14, respectively. Preferably the armrests are pivotally connected to the seat back for movement between a raised and a lowered position. In the Drawings, the armrests are illustrated in the lowered position. In the raised position, they are pivoted in an upwardly direction until they are substantially parallel to the seat back 14.

The connecting means between the armrests and seat back is preferably formed of metal tubing, 32. The metal tubing is securely attached by known means such as a bolt, welding, or the like to the underlying structure 24 of the armrest, and extends in an approximately perpendicular direction into the frame of car seat 10, the frame being described in detail below. Armrests 22a and 22b are positioned along seat back 14 at an appropriate height to provide comfort for the user.

The pivotal connection between the armrests and the seat back 14 preferably includes a locking mechanism 34 such that the armrests will not pivot beyond a certain arc encompassing the preferred lowered position and the preferred raised position. As illustrated in FIG. 4, the locking mechanism preferably comprises a slot 36 and a bolt 38 shown in phantom which extends into the frame and the slot. The length of slot 36 will determine how far up or down the armrest can pivot. When the end of the slot contacts the bolt, the armrest will be held in position. When the bolt reaches one end of the slot, substantial upward pressure on the armrest will not pivot the armrest to a further raised position; when the bolt reaches the other end of the slot, substantial downward pressure on the armrest will fail to pivot the armrest to a further lowered position. Thus, the slot can be of an appropriate length such that the armrest will not extend toward the back of car seat 10, and will extend forward to support a person's arm but will not drop to a further lowered position.

A steel-like frame 40 underlies seat base 12 and seat back 14, defining the approximately L-shaped form of the connected seat base and seat back. As illustrated in FIG. 3, that portion of the frame underlying seat back 14 can comprise welded steel tubing. In a preferred embodiment the seat back has 3 evenly spaced parallel lengths of steel tubing along the length of the seat back, a cross-wise portion of tubing welded across the top, and another crosswise portion of tubing welded across the center portion of the back to provide additional support and to provide for connection with the armrest 22a and 22b.

The portion of frame 40 underlying seat base 12 is preferably formed of a sheet of steel, which has been stamped and folded to the appropriate configuration. The portion of the frame underlying seat back 14 can also be stamped and folded from a separate or from the same sheet of steel, if desired, rather than being formed of steel tubing as described above.

Frame 40 can be formed of any steel-like material including steel and other strong metals, fiberglass, and the like, to provide protection to a seat's occupant in the event of an automobile accident.

Frame 40 can be bolted or otherwise anchored directly to the floor of a motor vehicle in the same manner as seats currently factory installed, thus providing increased stability and safety.

Car seat 10 can further include a tray 42 extending in a forwardly direction from seat base 12. Preferably tray 42 is formed as a part of frame 40. being stamped from the same sheet of steel. Alternatively, tray 42 can be formed of metal, plastic, fiberglass, or the like and can be welded, bolted, or otherwise attached to car seat 10. A divider 44 can be provided so that the tray will consist of two or more compartments. Preferably, the tray will comprise a frame defining its outer contours, and an insert piece formed of a material such as steel, aluminum, plastic and the like which serves as a bottom for tray 42. The insert piece preferably includes divider 44. In this way, insert piece 46 can be removed from tray 42 simply by lifting divider 44. Removing insert piece 46 provides a simple way to clean tray 42 which can collect dirt, crumbs, and the like. Tray 42 is conveniently placed for coffee cups, snacks, garage door openers, and the like, particularly when car seat 10 is positioned between two front bucket seats in a vehicle. Tray 42 generally rests on the floor of the vehicle when the seat is installed.

Frame 40 is appropriately furnished with upholstery materials. Padding comprising a foamed rubber material or other appropriate substance covers at least a portion of the frame, preferably covering the seat back 14, and the side walls 12 other than the front side wall 12a and bottom wall 12e of seat base 12. A flexible covering material is provided over the padding and covers substantially all exposed portions of the frame. The covering material can comprise a leather or a leather-like material, a crushed velvet-type upholstery fabric, or any suitable material. Preferably, the covering material will coordiate with the interior of the vehicle with which car seat is to be used. With the upholstery added to the frame, the seat back generally has a thickness of from about 1½"to 10".

Seat back 14 preferably includes an indentation at left side 14c and right side 14d. The indentation is of a size sufficient to accept armrests 22a and 22b when they are in the raised position approximately parallel to the seat back. This indentation as shown in FIG. 1 also provides additional support for the armrest when in the lowered position. Preferably the indentation is formed by an appropriate configuration of the upholstery covered frame 40.

Figure 6:
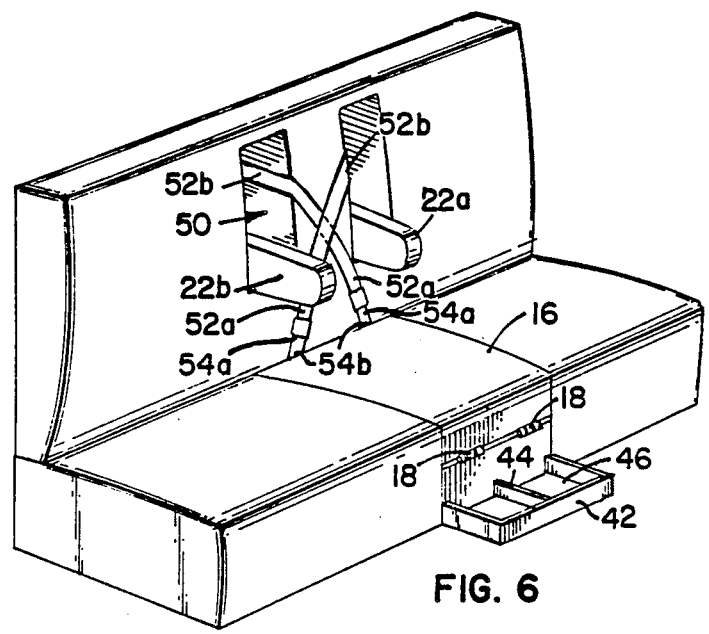
FIG. 6 is a perspective view of the auxiliary seat of FIG. 1 when used as part of a factory installed bench seat.

Car seat 10 further includes one or more seat belts 50. Seat belt 50 comprises a first portion 52 having a first end 52a and a second end 52b, and a second portion 54 having a first end 54a and a second end 54b. The second ends of the first and second portions, 52b and 54b are securely fastened to the frame by fastening means such as bolting or other means known in the art. As shown in FIG. 5, the seat belt portions can be fastened to the frame inside the receptacle or console portion, such that when in use they extend from between the lid 16 and the seat base 12. When not in use seat belt 50 can be stored within the console. FIG. 6 illustrates another seat belt configuration: two seat belts 50 are employed with the second seat belt ends 52b and 54b securely fastened proximate to the top end 14a and the bottom end of frame 40, respectively. The belt portions 52 preferably criss-cross the occupant's torso and are releasably fastened to a pair of seat belt ends 54a as discussed below. It should be noted that the unupholstered frame 40 illustrated in FIG. 3. is shown without one or more seat belts 50. Either seat belt configuration discussed above can be utilized, depending on the application.

The seat belt and its installation will preferably meet all government requirements for safety belts in vehicles, in its design, manufacture, materials and installation. With adults, the seat belt can be used as a lap belt. With children, the seat belt can extend diagonally across the child's chest, wrap around the top end 14a of seat back 14, extend diagonally back down across the chest to fasten to the other seat belt portion, as shown in FIG. 5.

Seat belt 50 includes a means to releasably fasten ends 52a and 54a of portions 52 and 54 together. This fastening means is any such means known in the art, and is preferably one which meets any relevant government safety standards and has obtained any necessary government approval for use with seat belts.

The car seat of this invention can be installed between the bucket seats of a car or truck to provide a comfortable, safe, attractive seating and storage unit. It is also envisioned that the typical bench seat could be modified to include this seat as a permanent feature of a vehicle, this embodiment being illustrated in FIG. 6. This could be accomplished by welding or bolting the frame of the car seat of this invention to the frame of the typical bench seat, for example by cutting away a portion of the bench seat frame and inserting the frame of the car seat of this invention in that location, where it could be welded to form a permanent portion of the seat. Such an arrangement would provide an armrest for those utilizing the bench seat, a permanently installed child safety seat, an additional storage console for the vehicle, and other desirable advantages.

Figure 7:
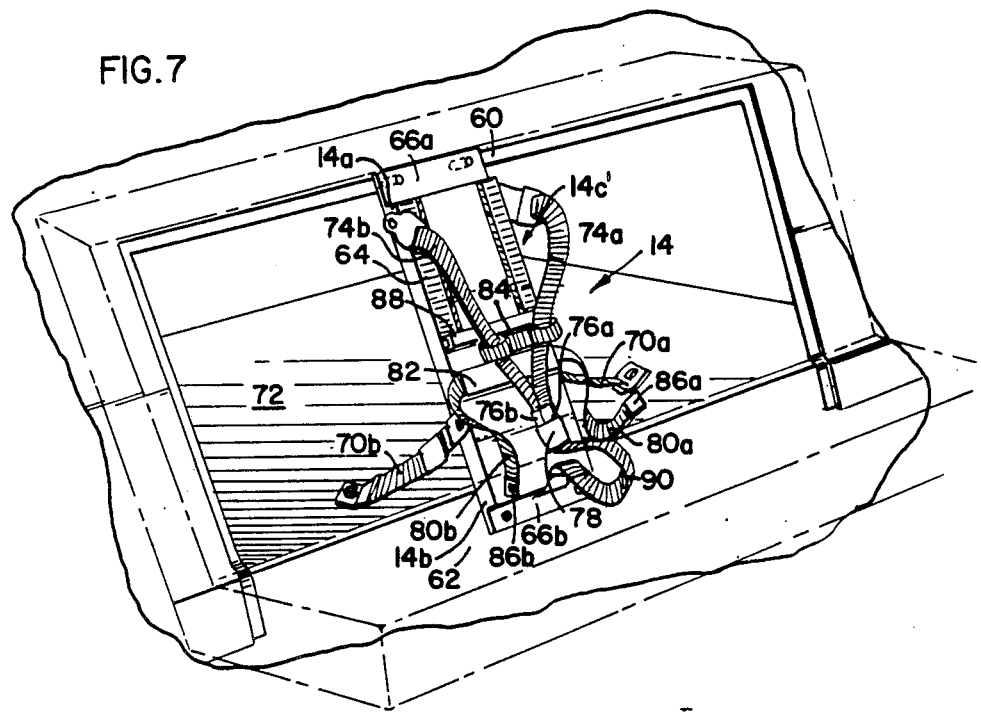
FIG. 7 is a perspective view of the back of the auxiliary seat of FIG. 6, with portions cut-away, wherein the back is connected to the frame of the back bench seat region of an automobile.
Figure 8:
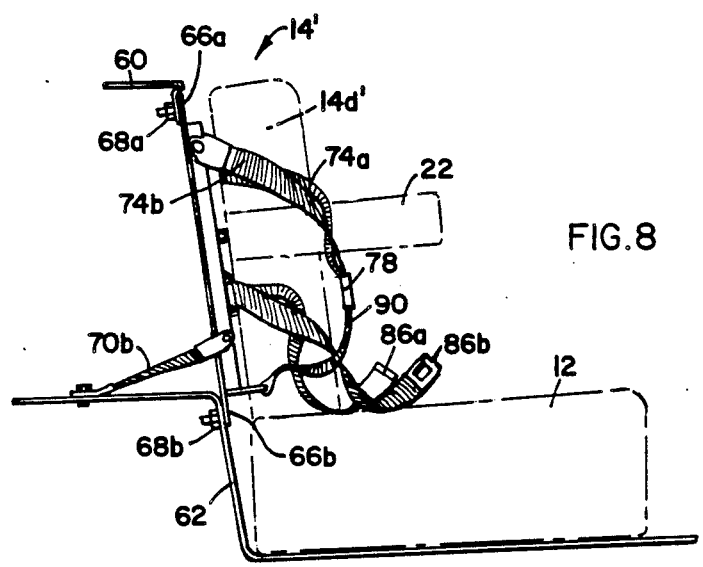
FIG. 8 is a side elevational view of the seat shown in FIG. 6, further illustrating the connection scheme between the auxiliary seat and the frame of the vehicle.

FIGS. 7 and 8 show a preferred technique for connecting the auxiliary seat of the present invention to the frame of an automobile. FIG. 7 shows a perspective view of an alternative seat back embodiment 14'. The seat back 14' is preferably stamped out of 12 to 18 Gauge steel as contrasted with the welded construction of the seat back 14 shown in FIG. 3. The seat back 14'is bolted at its top end 14a'to a top automobile bench seat frame member 60 and bolted at its bottom end 14b to a bottom automobile bench seat frame member 62. FIG. 8 shows the bolted connections in an elevational view.

The seat back 14' is preferably formed from a central body portion 64 which substantially spans the distance between the automobile bench seat frame members 62 and 60 when the seat back 14' is in place. The central portion 64 is preferably longitudinally ribbed or sectioned to give it greater bending resistance. Flanges 66a and 66b extending from the top and bottom ends, respectively, of the central body portion 64 receive bolts which also pass through mating holes in the automobile frame portions 60 and 62. Hex nuts 68a and 68b complete the assembly.

As an added measure of saftey, the seat back 14'can be strapped to the automobile. Nylon straps 70a and 70b attach at their first ends to sides 14c'and 14d', respectively, of the seat back 14'. At their second ends nylon straps 70a and 70b are attached to trunk floor 72. The bolting and strapping connection technique described above is the preferred technique, but other connection schemes are comtemplated.

It should particularly be noted that the seat back 14' alone can serve as an auxiliary seat. That is, the seat bottom 12 is unnecessary in some cases. For example, the bench seat back can simply be cut to accept the back 14', and the bench seat horizontal bottom need not be altered in any way.

The auxiliary seat back 14' preferably includes a five-point seat belt system. Shoulder belts 74a and 76b are attached to the central portion 64 near its top end and form two "points"of the five-point restraining system. They include male clasp members 76a and 76b, respectively, which detachably engage female clasp 78. Female clasp members for five-point connection systems are used in many standard child restraint seats. The shoulder belts 74 are held together roughly at their midpoints by loop 84. Loop 84 prevents shoulder belts 74 from simply separating in the event of an accident. Two more connection "points"are formed by lap belts 80a and 80b. Actually, the lap belts 80a and 80b are two ends of a continuous belt 80 which extends through a slit formed by a channel 82 attached to the central portion 64. Lap belts 80a and 80b include male clasp ends 86 which releasably engage the female clasp member 78.

A single centrally-located lower belt 90 forms the last "point"of the five point system. It extends upward from a point proximate the bottom automobile frame member 62 and includes a male clasp member 86 for connecting to the female clasp member 78.

The seat back 14' also includes a horizonal channel section 88 mounted on the central portion 64 suitable for receiving metal tubing 32 of the armrests 22.

It should be noted that the seat back 14', and the other embodiments of the present invention, possesses several advantages over standard child restraint seats which rest on a vehicle's upholstery and are strapped down using the vehicle's existing seat belt(s). This is particularly evident when side impact is considered: The seat back 14' connects directly to a vehicle's frame, whereas a standard child restrain seat is separated from the vehicle's frame by loose springs and frame padding. A standard child restraint seat can therefore twist in the event of a side impact, exposing the child to flying glass and metal. The seat back 14', on the other hand, will not twist but will instead remain attached to the automobile's frame. The armrests 22 also help to keep the child in one place in the event of a crash.

It is envisioned that a headrest could be added to the car seat of this invention, as shown in phantom in FIG. 1. The headrest could be of any type known in the art, and could be adjustable in height if desired.

It is also envisioned that the car seat of this invention, when installed between bucket seats, could be mounted on a track as are the bucket seats. By slidably mounting the car seat on a track by any arrangement known in the art, the seat could be conveniently moved forward or backward to better accomodate a variety of passengers.

The car seat of this invention can be made in a variety of sizes, from a smaller version to accomodate a six-month old child, to a full sized version to accommodate an adult. Smaller seats are generally simply scaled down versions of the larger seat. The car seat of this invention can be used with infants of approximatley six months and older, with children of all ages, with adults, and even with pets such as dogs which for safety reasons should be restrained during travel.

Obviously many modifications and variations of the present invention are possible in light of the above teachings. It is therefore to be understood that, within the scope of the appended claims, the invention may be practiced otherwise than as specifically described.

I claim:

1. A safety seat suitable for permanent mounting as an integral part of an automobile bench seat, the bench seat having a bench seat frame, the automobile having a trunk floor, comprising:
   (a) a main frame, the main frame comprising: (1) a central body portion, the central body portion being longitudinally ribbed; (2) a perforated top flange, the top flange being integrally formed with the central body portion; (3) a perforated bottom flange, the bottom flange being integrally formed with the central body portion at an end opposite the top flange;
   (b) a first set of mounting bolts, the mounting bolts passing sequentially through the perforations of the top flange and mating perforations within the bench seat frame, the bolts thereafter being secured by nuts;
   (c) a second set of mounting bolts, the mounting bolts passing sequentially through the perforations of the bottom flange and mating perforations within the bench seat frame, the bolts thereafter being secured by nuts;
   (d) a seat base;
   (e) a seat back having a top end, a bottom end, a left side, a right side, a front side and a back side, the bottom end of the seat back being connected to the back end of the seat base such that the seat back and the seat base define an approximately L-shaped form, the seat back being adjacent and parallel to the main frame and connected thereto;
   (f) an armrest having a back portion and an inner side, the armrest being connected at the inner side of the back portion to one of the left and right sides of the seat back;
   (g) a seat belt having a first and a second portion, each portion having a first and a second end, the first and second portions being securely fastened at the second ends to the main frame, and the seat belt further comprising means to releasably fasten the first ends of the first and second portions together; and
   (h) a pair of straps, each strap being fastened to the central body portion at one end, the strap being fastened to the trunk floor at an opposite end, the strap thereby preventing twisting when the bench seat frame is subjected to side loads.

* * * * *